United States Patent

Eicker et al.

[11] Patent Number: 5,573,660
[45] Date of Patent: Nov. 12, 1996

[54] SCREW CONVEYOR

[75] Inventors: Peter Eicker, Rinteln; Kurt Ebeling, Auetal, both of Germany

[73] Assignee: Noggerath Holding GmbH & Co. KG., Ahnsen, Germany

[21] Appl. No.: 457,071

[22] Filed: Jun. 1, 1995

[30] Foreign Application Priority Data

Jun. 3, 1994 [DE] Germany ............... 44 19 612.1

[51] Int. Cl.⁶ ................... B01D 29/94; B01D 35/02; E02B 5/08; E02B 8/02
[52] U.S. Cl. ............... 210/162; 210/159; 210/413; 100/117; 100/145; 198/608; 198/670; 198/671; 198/677
[58] Field of Search .................... 210/162, 159, 210/413, 415; 100/117, 145; 198/608, 671, 677, 670

[56] References Cited

U.S. PATENT DOCUMENTS

| | | |
|---|---|---|
| D. 323,414 | 1/1992 | Bruke . |
| D. 326,944 | 6/1992 | Bruke . |
| 2,665,796 | 1/1954 | Anderson . |
| 3,688,687 | 9/1972 | Craig . |
| 3,695,173 | 10/1972 | Cox . |
| 4,091,693 | 5/1978 | Straub . |
| 4,424,129 | 1/1984 | Bunger . |
| 4,779,528 | 10/1988 | Bruke . |
| 4,859,322 | 8/1989 | Huber . |
| 4,922,768 | 5/1990 | Bruke . |
| 4,961,864 | 10/1990 | Bruke . |
| 5,000,307 | 3/1991 | Bruke . |
| 5,092,453 | 3/1992 | Bruke . |
| 5,421,251 | 6/1995 | Bruke . |

FOREIGN PATENT DOCUMENTS 4136401  11/1991  Germany .

Primary Examiner—Thomas M. Lithgow
Attorney, Agent, or Firm—Anderson, Kill & Olick P.C.

[57] ABSTRACT

A screw conveyor including a feed screw formed, at least partially, as a shankless screw, a jacket surrounding the feed screw and a brush cooperating with the inner surface of the jacket for cleaning the same, with the feed screw including a plurality of substantially band-shaped screw threads extending along an imaginary helical line and arranged, when viewed in a transporting direction, one behind the other with an ever increasing distance from a screw axis so that each two adjacent screw threads form a step therebetween, and with the brush being arranged on the step formed by two outmost screw threads.

18 Claims, 4 Drawing Sheets

5,573,660

SCREW CONVEYOR

BACKGROUND OF THE INVENTION

The present invention relates to a screw conveyor for transporting solid materials and including a feed screw formed, at least partially, as a shankless screw of a plurality of substantially band-shaped screw threads extending along an imaginary helical line, a jacket surrounding the feed screw, and a brush cooperating with the inner surface of the jacket.

Screw conveyors of the above mentioned type are well known. These conveyors serve for transporting or conveying of dry, wet, moisturized, pasteurized, sticking, dusty, and/or coarse solid materials. The Jacket envelops the feed screw to a greater or lesser degree. It is also possible to completely surround the feed screw to avoid problems associated with transportation of dusty, spreading and odorous materials. The screw and the jacket can be formed of metal, but also of plastic materials. The length of such screw conveyors can reach 40m, with the diameter being in a range of 20–2000 mm. The central axis of the feed screw can be inclined to a horizontal at an angle of from 0° to 35°. It has been established in many cases that the amount of the transported solid material very much depends on the inclination angle of the feed screw. In particularly, at an inclination angle of more than 35°, the materials fall through the free space of the shankless screw, and the delivery output of a screw conveyor can be reduced to zero.

International application WO/90/5100 discloses a screw conveyor having a shankless screw formed of at least two substantially band-shaped screw threads extending along an imaginary helical line. A particular type of a screw conveyor is designed for discharging solid materials contained in a solid-liquid mixture, which flows through a trough. Here the trough is, a transporting section for transporting solid-liquid mixtures. The known trough can be manufactured from, e.g., cement, steel, stainless steel, aluminum, plastics and other suitable materials. In addition, the screw conveyor can be mounted on a container for a solid-liquid mixture. The container maybe a receiving tank, an intermediate container, a storage container and the like formed of a suitable material. The jacket or sheath of a such screw conveyor is designed so that it can be penetrated by the flowing fluid and is formed as a sieve jacket extending into the trough at an angle.

The screw conveyor of this type comprises a closed tube in which the solid material is compressed, rinsed, if needed, and finally discharged into a collecting tank. For improving the flow characteristics of the feed screws, they, at least, in the region of the trough, are formed as a shankless screw, that is the central region of the screw is empty. This leads to that, at an inclination angle of the sieve jacket or the feed screw of more than 35°, the transported solid materials falls through the screw empty or free region and are not discharged. This leads to that, at different delivery heights, feed screws should have different length, and that substantially increases manufacturing costs.

Accordingly, an object of the invention is a screw conveyor devoid of the above-mentioned drawback and, in particular, a conveyor which can be used at a more steep installation angle than the conventional screw conveyors.

SUMMARY OF THE INVENTION

This and other objects of the invention, which will become apparent hereinafter, are achieved by arranging the screw threads, when viewed in the transporting direction so that the front screw thread is spaced from the screw central axis a distance smaller than that of a screw thread located behind, with the brush being arranged on the step formed by two outmost screw threads. Separate screw threads form with the screw central or rotational axis an angle of about 90°. The screw threads are arranged so that each pair of adjacent screw threads forms a step therebetween, with the screw threads being axially downwardly displaced relative to each other. Thus, the steps, when viewed from the central axis, are arranged one beneath the other toward the sieve jacket. This prevent the material, which is transported by the screw, from falling through the free space of the shankless screw. By arranging the brush on the step formed by outmost screw threads, it is advantageously achieve that the brush, which has likewise a helical shape, is quasi setback, so that the screw thread closest to the sieve jacket extends, along some portions thereof, adjacent to the brush. This arrangement insures that the friction resistance of the helical brush, which slows the transportation of the material, is significantly reduced, whereby the sliding of the transported material along screw flanks is substantially facilitated.

Advantageously, according to the invention, the front, when viewed in the transportation direction, surface of the brush is aligned with a substantially radially extending, with respect to the screw axis, surface of the screw thread adjacent to the outmost screw thread. Thereby it is achieved that the brush and the screw thread adjacent to the outmost screw thread form a continuous smooth surface so that the transported material which slides outwardly under the action of tangential forces and gravity, encounter a minimal resistance. Transporting characteristics are substantially improved when the transported material slides smoothly along the brush helices. In the screw conveyor, the friction resistance of the jacket, which surrounds the screw, acts as a resistance force. By forming a smooth transporting surface, it is achieved, that the friction resistance along the inner surface of the jacket is greater than the friction resistance of the transporting surface of the screw. This prevents the transported material from being retained on the screw, without being transported along the jacket in the transportation direction.

It is further advantageously provided according to the invention, that the width of an innermost screw thread is very small in comparison with a length or height thereof measured in the screw axial direction. Thereby, the screw weight is reduced, without a need to eliminate a step between the inner-most and the next adjacent screw threads. Again, by forming a relatively long first step, the transporting characteristics of the feed screw are improved. Because of its small width, the innermost screw thread does not contribute in any substantial way to the transportation of the material by the screw. This further insures that the solid material, which is transported by the screw, would not fall into the free space provided between the screw threads.

It is further advantageously provided that the end face of each screw thread, located further away from the screw central axis, forms a step which, advantageously extends substantially perpendicular to the upper surface of the screw threads and downwardly therefrom. This form of the screw prevents the material, which is transported by the screw, from being pressed against the jacket, which would have led to increased friction forces and, on occasion, to a stoppage of the conveyor due to jamming of the material between the screw and the jacket.

It is further advantageously provided according to the invention, that the jacket comprises a sieve surface and is used, in this case, for discharging of the solid material contained in a solid-liquid mixture which flows through a trough or stored in a container.

The improvements according to the present invention permit to mount the conveyor so that the feed screw extends to a horizontal at an angle of more than 35°.

BRIEF DESCRIPTION OF THE DRAWINGS

The objects and features of the present invention will become more apparent, and the invention itself will be best understood from the following detailed description of the preferred embodiment when read with reference to the accompanying drawings, wherein.

DETAILED DESCRIPTION OF THE PREFERRED EMBODIMENTS

A screw conveyor according to the present invention can generally be used for transporting solid material. If the feed screw surrounding sheath is formed, at a least along portion thereof, as a perforated basket, the screw conveyor can be used as a sieve conveyor for carrying away solid material from a solid-liquid mixture filling a trough or a container. Further explanations are made with reference to a particular embodiment of a screw conveyor mounted on a trough. However, this does not mean that the invention is limited to this particular embodiment of a screw conveyor.

Figure 1:
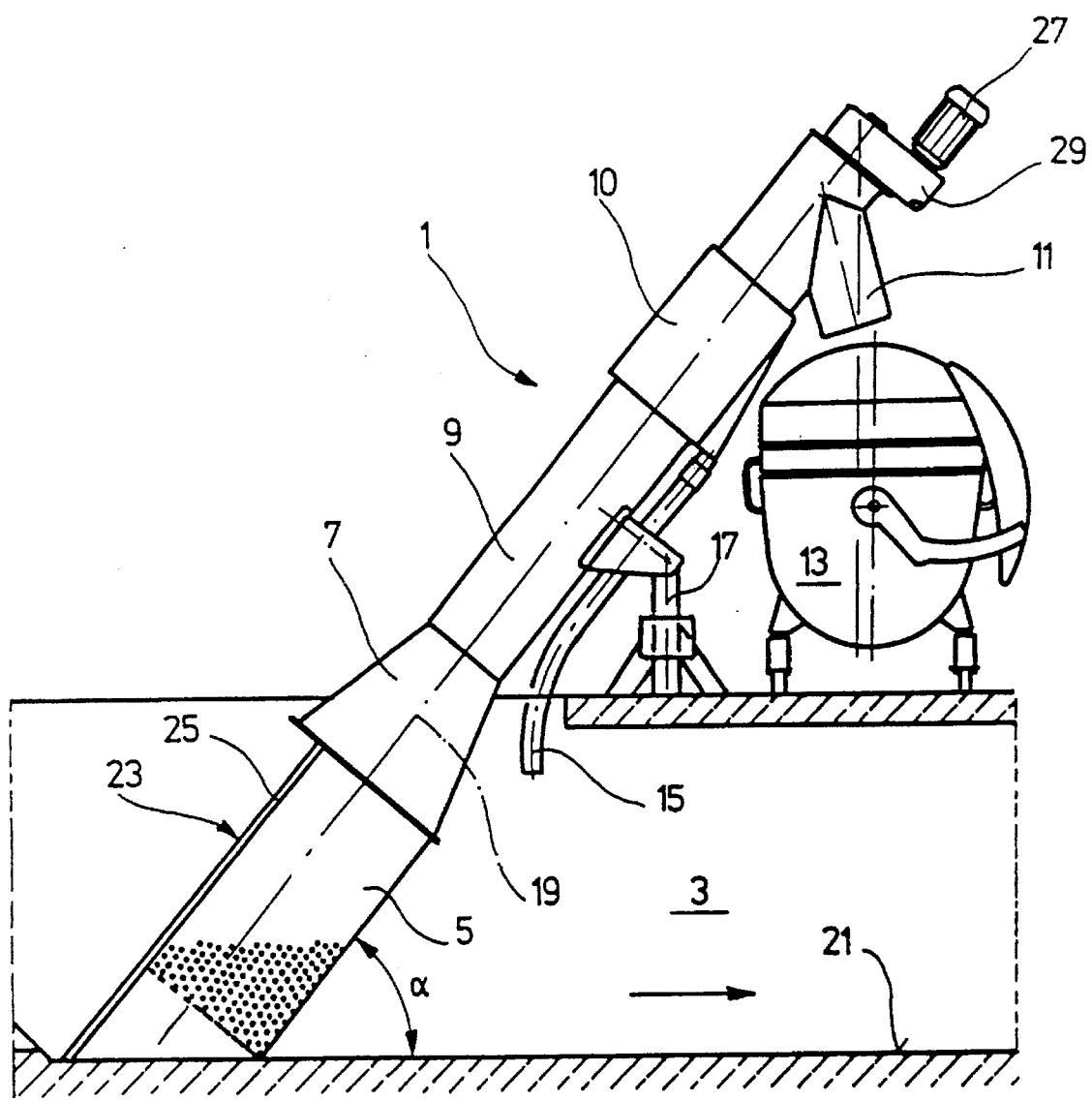
FIG. 1 is a schematic side view of a screw conveyor inserted into a trough.

The screw conveyor 1, shown in FIG. 1, has a feed screw extending into the trough 3 and surrounded about the region thereof, projecting into the trough 3, with a sieve jacket 5. The sieve jacket 5 is cylindrical and is provided, as shown, with a plurality of openings. The number and cross-section of the openings are selected dependent on the application and operational conditions of the screw conveyor 1. Usually, the openings are circular. However, according to a designated application, elongate openings or so-called bar sieve plates can be used. However, the cross-section of the openings does not form part of the present invention, and would not be further discussed. As shown in FIG. 1, the sieve jacket 5 has a plurality of substantially symmetrically arranged round openings. The sieve jacket 5 can be formed of a substantially cylindrical sheet metal portion or a sieve plate, which is not completely closed but rather is open, facing in a direction opposite to the direction of a stream flowing through the trough 3, as indicated by an arrow. Through the opening in the sieve jacket, the solid-liquid mixture, which flows through the trough 3, can enter the sieve jacket, with the liquid flowing through the openings in the sieve jacket and the solids being retained there. The retained solids are carried away from the region of the sieve jacket 5 by a feed screw (not shown in FIG. 1) through a conical tube section 7 into a cylindrical tubular regions. Therefrom, the solids are carried through a pressure section 10 to an ejector 11 which discharges the solids into a container 13. The container 13 is provided outside of the trough 3. The solids, which are carried away from the trough 3 are compressed in the pressure section 10. The squeezed out water is returned to the trough 3 through a drain pipe 15. The screw conveyor 1 is supported in a suitable manner with a mounting 17, secured outside of the trough 3.

The rotational or central axis 19 of the screw conveyor 1 is inclined with respect to the bottom 21 of the trough. It may be inclined, e.g., at an angle of 45%. The sieve jacket 5 extends up to the bottom 21. In the region of the jacket opening 23, which faces the stream of the solid-liquid mixture, there are provided guiding plates 25 which extend up to the side limiting walls of the trough 3 and serve to insure that all of the mixture flows through the sieve jacket 5.

A suitable drive 27 is provided on the screw conveyor 1 and which drives, through a gear box 29, the feed screw of the screw conveyor 1.

Figure 2:
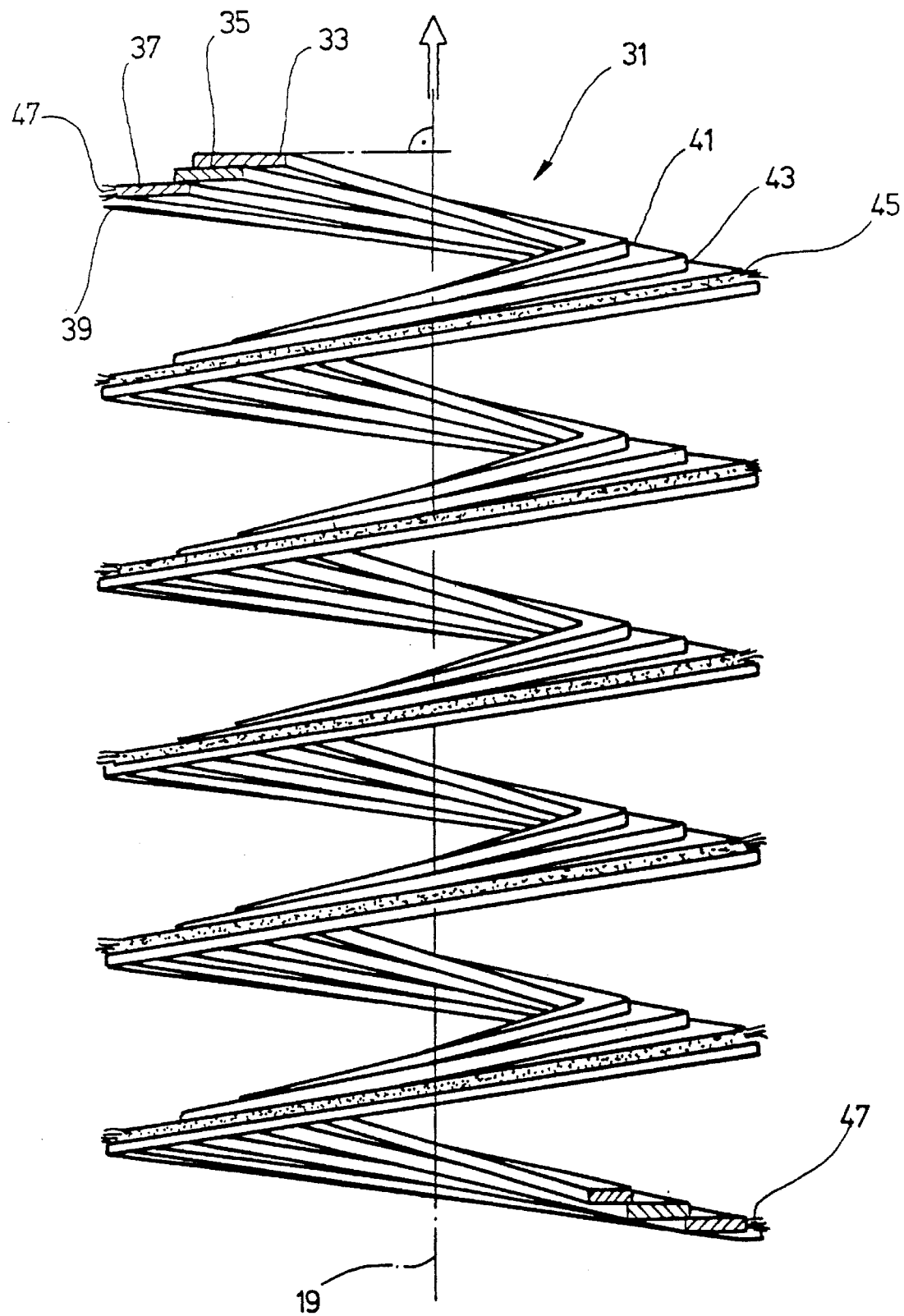
FIG. 2 is a side view of a screw used in a screw conveyor of FIG. 1.

FIG. 2 shows a section of the feed screw, which extends inside of the conveyor 1 and, in particular, the section that extends inside of the sieve jacket 5 (FIG. 1). This feed screw section is formed as a screw 31. The screw 31 of the section located in the region of the sieve jacket 5, is formed as a shankless screw. The outer diameter of the screw 31 is so selected that it contacts the inner surface of the sieve jacket 5. The screw 31 have at least two, in the discussed example, four screw threads 33, 35, 37 and 39 each formed as a band. As can be seen in FIG. 2, which shows cross-sections of the upper and lower regions of the screw 31, with the cross-sectional plane passing through the rotational or central axis of the screw conveyor 1, the cross-section of each separate screw thread is substantially rectangular. The screw threads 33, 35, 37 and 39 partially overlap each other and form together a stepped surface. The screw threads 33, 35, 37 and 39 are so arranged that each large surface, visible in the cross-section, form with the central axis 19 a substantially rectangular angle.

The separate screw threads 33, 35, 37 and 39 are arranged along an imaginary helical line 50 that the screw 31 forms the feed screw. The outer diameters of the separate screw threads 33, 35, 37 and 39 are not equal to each other. The screw thread 33 with the smallest outer diameter lies somewhat inward of the adjacent screw thread 35, so that the screw threads 33 and 35 partially overlap each other. The outer diameter of the screw thread 35 is somewhat larger than the inner diameter of the screw thread 37 so that these two screw threads likewise overlap each other. The outer diameter of the screw thread 37 is correspondingly larger than the inner diameter of the screw thread 39, and these two screw threads also overlap partially each other. Thus a stepped structure, mentioned above, is formed.

The outer diameter of separate screw threads 33, 35, 37, 39 remains the same over the entire visible longitudinal extension of the spiral 31, visible in the direction of the central axis 19. Thereby, upon rotation of the screw 31 about the central axis 15 a cylindrical envelope if formed for each of the screw threads 33, 375, 37 and 39, with the outer diameter of the outmost screw thread 39 being somewhat smaller than the inner diameter of the sieve jacket 5.

When the screw 31 is rotated by the motor 27, the solid material accumulated in the sieve jacket 5 will be transported in the direction indicated by the arrow (FIG. 2). The screw thread 33, which is the frontmost thread seen in the transporting direction, is thus spaced from the central axis a smaller distance then the screw thread 35 located rear of the screw thread 33. The same applies to the screw threads 35 and 37, as well as to screw threads 37 and 39.

Because of the substantially rectangular cross-section of the separate screw threads 33, 35, 37 and 39, the edges of the screw threads 33, 35, 37 and 39, remote from the axis 19, define steps 41, 43 and 45 having flanks extending perpendicular to the surfaces of the contiguous screw threads. Because the outer diameter of each screw thread 33, 35, 37 and 39 is the same along its entire longitudinal extension, as seen along the axis 19, the steps 41, 43, 45 do not generate any outwardly directed, toward the sieve jacket 5, forces acting on the solid material transported by the screw 31. However, the steps 41, 43 and 45 prevent the solid material from falling into the free middle space of the screw 31, which extends around the axis 19. First of all, the steps 41, 43, 45 prevent the slippage of the materials collected on the screw 31 into the free space of the screw 31. Thus, the inner surface of the sieve jacket 5 forms quasi transporting pockets which insure an improved delivery of solid material out of the trough 3 even in the case when the screw conveyor is mounted in the trough 3 at an angle of more than 35°.

The separate screw threads 33, 35, 37 and 39 have a simple structure, so that the screw 31 can be economically manufactured.

Figure 8:
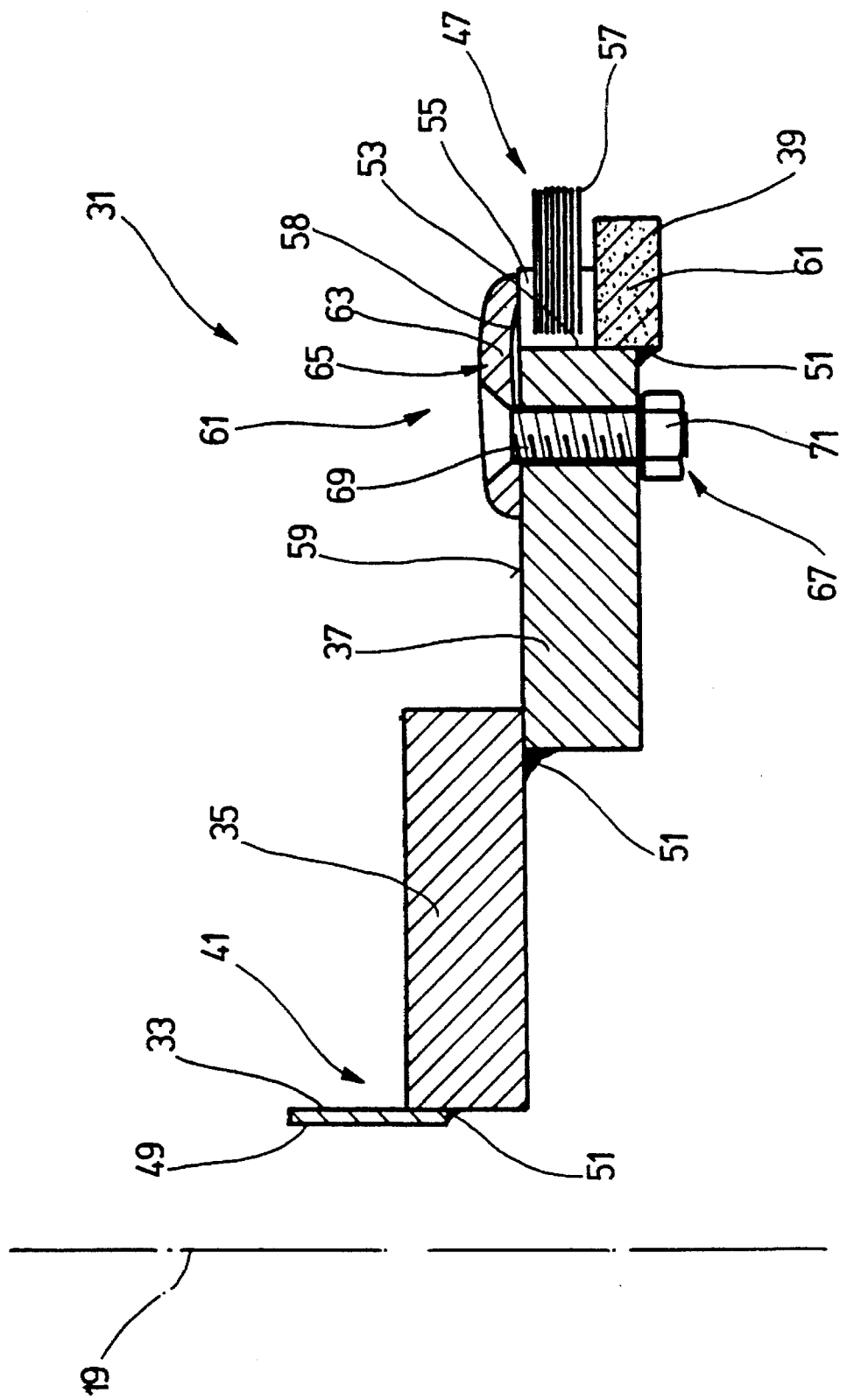
FIG. 8 is a schematic cross-sectional view of a preferred embodiment of a screw used in a screw conveyor of FIG. 1.

The outer circumference of the outmost screw thread 39 is provided with brush 47 cooperating with the inner surface of the sieve jacket 5 and serving for cleaning the inner surface of the sieve jacket 5. The brush 47 does not freely extend beyond the screw 31. Rather, it is covered partially by the screw thread 39. The brush 47 is thus quasi set rearward in the region of the last step 45 between the outmost screw thread 39 and the second outmost screw thread 37, as shown in FIG. 8. Thereby, the material, which is carried away by the screw 31 out of the trough 3, can be carried toward the outmost screw circumference during rotation of the screw 31 in the sieve jacket 5. The friction drug of the screw 31, acting on the solid material or the sieved material, is thereby substantially eliminated, and sliding of the transporting material along the screw sides is thereby facilitated. Namely, if the transporting material settles on the surface of the screw 31, a simple rotation of this material would take place, without its being transported toward the central axis 19, which is very important for transporting the solid material out of the trough 3, especially because the transported material need by conveyed through the conical tubular section 7 and the tubular region 9 toward the ejector 11.

Generally, it should be recognized that the separate elements, i.e., the screw thread 33, 35, 37 and 39, which form the screw 31, are designed very simply. Advantageously, band-forming materials are used which extend along an imaginary helical line. The connection of the separate screw threads 33, 35, 37 and 39 can be effected in a very simple manner, e.g., by conventional welding processes, with the screw threads 33, 35, 37 and 39 being welded to each other along their lower edges, or by a spot welding. The screw 31 insures mounting of the screw conveyor 1 with respect to the trough 3 at a steep angle, without the material, which is transported by the screw 31 in the region of the sieve jacket 5, falling through the free space of the shankless screw back into the trough 3 which, otherwise, would have resulted in a substantial reduction of the efficiency of the screw conveyor which occasionally could have been reduced to zero.

By the specific design of the screw threads 33, 35, 37 and 39, which have an ever increasing diameter from step to step, with the screw thread having the smallest diameter being the frontmost position in the transporting direction, transporting pockets are formed which provide for an improved discharge of the solid materials. Simultaneously, outer edges of the separate screw threads 33, 35, 37 and 39 which, during rotation of the screw 31, circumscribe an imaginary cylindrical surface, insure that the solid material does not pressed against the sieve jacket 5. The pressuring of the solid material against the sieve jacket 5 increases, on one hand, pressure forces and a resulting drive energy and, on the other hand, can lead to jamming of the solid material between the steps 41, 43 and 45 of the screw 31 in the free space thereof and the inner surface of the sieve jacket 5 resulting in the pile-up of the solid material.

FIG. 2 shows that the radial, i.e., perpendicular to the axis 19, width of separate screw threads 33, 35, 37 and 39 can be varied to adapt the arrangement of the steps 41, 43 and 45 to the transporting solid material as well as to the total outer diameter of the screw 31. It has already be mentioned that the screw threads 33, 35, 37 and 39 are formed of metal. It should be self-evident that for transporting a particular material and by selecting appropriate components, it is possible to form the separate screw threads 33, 35, 37 and 39 of a plastic material.

The discussion of the structure shown in FIGS. 1 and 2 was based on a premise that the screw threads at least partially overlap each other. This arrangement insures a stability of the feed screw threading.

Figure 3:
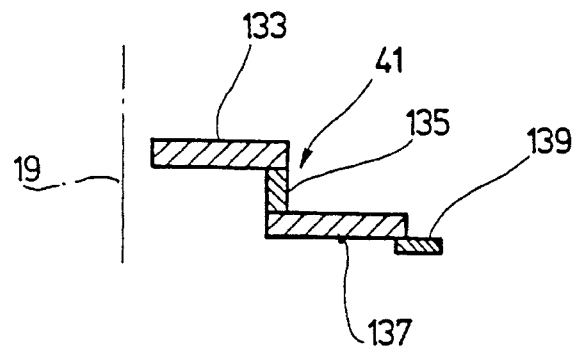
FIG. 3 is a cross-sectional view of the screw used in a screw conveyor of FIG. 1.
Figure 4:
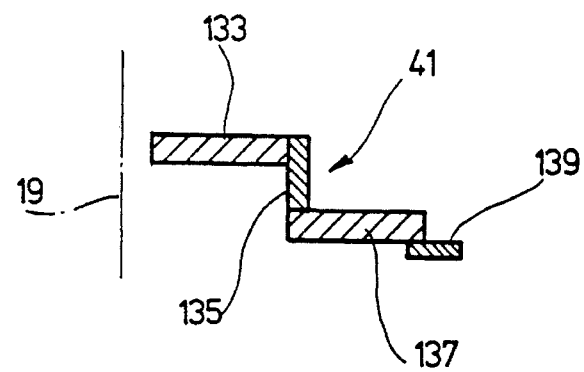
FIG. 4 is a cross-sectional view of another embodiment of a screw used in a screw conveyor of FIG. 1.
Figure 5:
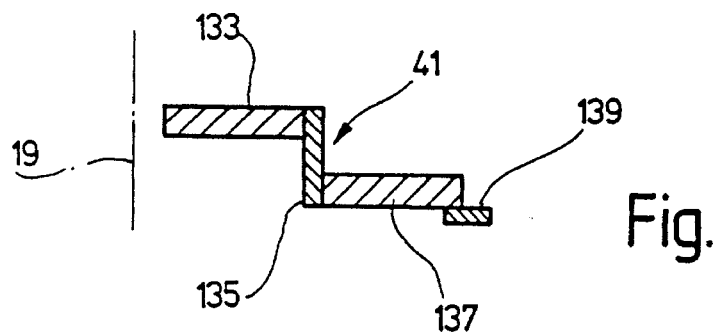
FIG. 5 is a cross-sectional view of yet another embodiment of a screw used in a screw conveyor of FIG. 1.

FIGS. 3–5 show other embodiments of the screw in which the overlapping is effected in a manner different from that shown in FIGS. 1, 2. Namely, in the embodiments of FIGS. 3–5, the transition region between two adjacent band-shaped screw threads, the central plane of which extends transverse to the screw central axis 19, is formed by a screw thread 135 which extends parallel to the screw central axis 19. For the sake of clarity, the brush 47 is not shown in the embodiments of FIGS. 3–5. However, it should be clear that the brush would be arranged at a step formed by the two outer screw threads.

In the embodiment of FIG. 3, which is shown schematically, the intermediate screw thread 135 extends between the innermost screw thread 133, which is closest to the central axis 19, and the further screw thread 137, with the opposite end surfaces or sides of the screw thread 135 abutting respective large surfaces of the spaced screw threads 133 and 137. The screw threads 133, 135, 137 can be connected with each other by welding.

The outmost screw thread 139 is arranged in overlapping relationship with the screw thread 137 in a manner already described with reference to FIG. 2.

By using a substantially vertically extending screw thread 135, the height of the step 41 is increased. The greater is the width of the screw thread 135, measured in a direction parallel to the central axis 19, the greater is the height of the step 41.

The embodiment of FIG. 4 is substantially similar to that of FIG. 3, and the identical elements will be designated with the same reference numerals. The difference between the embodiments of FIGS. 3 and 4 consist in that in the embodiment of FIG. 4, the end surface of the screw thread 133, which is remote from the central axis 19, abuts a large surface of the next screw thread 135 the end surface of which, remote from the screw thread 133, abuts a large surface of the adjacent screw thread 137.

In the embodiment of FIG. 4, the outmost screw thread 139 is likewise arranged in overlapping relationship with the adjacent screw thread 137.

Yet another embodiment of the screw is shown in FIG. 5, wherein the screw thread 135, which extends between the screw threads 133 and 137, have its opposite large surfaces abutted with respective end surfaces of the axially spaced screw threads 133 and 137. In this embodiment likewise, the outmost screw thread 139 is arranged in an overlapping relationship with the adjacent screw thread 137.

In the embodiments of FIGS. 4 and 5, the screw thread 135 forms the step 41, as it has already been described above with reference to FIG. 3.

From the discussion of the embodiments of FIGS. 3–5, it should be clear that by selecting the width and thickness of separate screw threads, steps having different height and width can be provided. By at least partial overlapping of adjacent screw threads, high stability of the whole screw is achieved.

Figure 6:
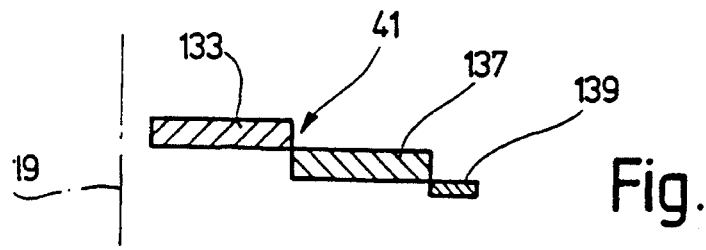
FIG. 6 is a cross-sectional view of a further embodiment of a screw used in a screw conveyor of FIG. 1.
Figure 7:
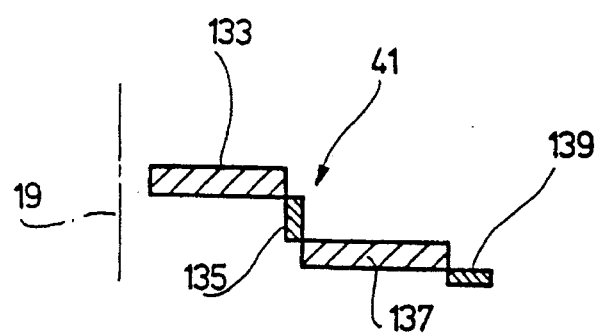
FIG. 7 is a cross-sectional view of a still further embodiment of a screw used in a screw conveyor of FIG. 1.

FIGS. 6 and 7 show embodiments of a screw formed of separate screw threads without any overlapping therebetween. The separate screw threads are connected, in a suitable manner, e.g. by welding, along their edges. It is contemplated to provide on the back side of the feed screw, which is opposite to the conveying side of the screw, stabilizing elements spaced from each other a greater or lesser distance. Providing of the stabilizing elements is, of course, possible in the embodiments shown in FIGS. 2–5.

FIG. 6 shows three screw threads 133, 137 and 139 arranged adjacent to each other. Two of the screw threads 133 and 137 have approximately the same width and thickness, with the third screw thread 139, located most remotely from the central axis 19, having smaller width and thickness. The screw threads 133, 137 and 139 contact each other in their respective edge regions because the outer diameter of the screw threat 133 is as large as the inner diameter of the screw threat 137, and the outer diameter of the screw thread 137 is as large as the inner diameter of the screw thread 139.

The height of the step 41 is determined by the thickness of the screw thread 133.

When a larger height of the step 41 is desired, a further axially extending screw thread 135 can be provided between the screw threads 133 and 137 as shown in FIG. 7, with the screw thread 135 engaging the screw threads 133 and 137 only along its edges. In the embodiment of FIG. 7, the screw thread 139 is farthest from the central axis 19.

FIGS. 3–7 make it clear that the shape of the screw can be varied within a wide range, without departing from the basic design concept.

The selection of the width and the thickness of separate screw threads is generally adapted to the desired operational conditions. As it follows from FIGS. 3–7, the brush, projecting beyond the outmost envelope surface of the outmost screw thread, can be dispensed with when there is no need in the cleaning of the inner surface of the screw conveyor jacket. This, e.g., is the case when the jacket has a continuous surface and is not formed as a sieve.

FIG. 8 shows a cross-sectional view of a particularly preferred embodiment of the screw 31. For more comprehensive understanding of teachings of the invention the elements of FIG. 8 corresponding to those of FIG. 2 will be designated with the same reference numerals, despite somewhat different shapes of the elements of FIG. 8. In FIG. 8, the screw 31 has four screw threads 33, 35, 37 and 39. The innermost screw thread 33, i.e., the screw thread located closest to the screw central axis 19, is formed as a bar 49 extending in the axial direction of the screw 31. The bar 49 has a width which is smaller in comparison with its length or height. Thereby it is achieved that a relatively high step 41 can be obtained with a relatively small consumption of material. The surface portion of the screw thread 35, which is closer to the central axis 19, abuts in a partially overlapping relationship the surface portion of the screw thread 33, which is closer to the inner surface of the sieve jacket. The mechanical connection between the screw threads 33 and 37 is provided by a weld seam 51. The screw threads 33 and 35 contact each other, in the same way as in FIG. 2, with their respective surfaces extending radially with regard to central axis 19, so that the transporting surface of the screw thread 37 overlaps the non-transporting surface of the screw thread 33. The weld seam 51 is provided for connecting the two screw threads and for their stabilization.

The screw thread 39 contacts with its surface portion, which is closer to the central axis 19, the surface portion of the screw thread 37 which is closer to the sieve jacket. The connection of the two screw thread 37 and 39 is again effected with the weld seam 51. By partial overlapping of the screw thread 39 and 37, a step 53 is formed, inside of which the brush 47 is provided. The brush 47 has a base body 55 in which separate bristles 57 are secured. The separate bristles 57 extend substantially parallel to the surface of the outmost screw thread 39. The base body 55 is band-shaped and follows a helical line determined by the screw thread 37 or 39. The substantially U-shaped base body 55 has a somewhat square cross-section, with the front surface 58, when viewed in the transporting direction, being aligned with the front surface 59 of the screw thread 37. That is both surfaces 58 and 59 form practically a continuous smooth surface. The substantially square cross-section of the base body 55 represents an ideal concept. From the manufacturing point of view, it could happen that the leg of the U-shaped base body 55, which loads the bristles 57 is tilted, i.e., extends slightly inward toward the bristles 57. That means that the front surface 58 of the base body 55 is somewhat inclined relative to the surface 59 of the screw thread 57.

With the surface 61, facing in a direction opposite to the transporting direction, the base body 55 lies on the screw thread 39. For retaining of the bristles 57, there is provided a clamping device 62 comprising at least one clamping element 65 formed as a retaining clip 63. Along the helical line of the screw 31, there is provided a plurality of clamping devices 62, spaced from each other, which insure a reliable retention of separate bristles 57. With the retaining clip 63, which overlaps the front surface 58 of the base body 55, the base body 55 is pressed against the screw thread 39 and is firmly retained between the retaining clip 63 and the screw thread 39. For loading of the retaining clip 63, there is provided a tensioning element 67 for applying a clamping force to the retaining clip 63. The tensioning element 67 is formed, e.g., as a tensioning screw 69 extending through respective openings of the retaining clip 63 and the screw thread 37. At the end of the tensioning screw 69, opposite to the transporting direction of the screw 31, a retaining nut 71 is provided.

In the embodiment shown in FIG. 8, the tensioning screw has a countersunk head located in a corresponding recess provided in the retaining clip 63. The retaining clip 59 has rounded edges which prevent retention of materials transported by the screw 31.

According to another embodiment of the screw 31 (not shown), the clamping device 62 can be located in a corresponding recess provided in the screw thread 37 and be countersunk in the base body 55 to provide a smooth transporting surface, formed by surfaces 58 and 59, for transporting the materials. Finally, it is possible to secure the bristle brush 47 with a screw extending through the base body 55 and secured in the screw thread 39.

The provision, as shown in FIG. 8, of aligned surface 58 of the base body 55 and surface 59 of the screw thread 37, which also, as discussed, can be inclined somewhat to each other, is contemplated as a possible, particularly preferred embodiment of screw 31. Therefore, the deviation of the surface 58 from the surface 59 in any of opposite directions is also within the scope of the present invention. If a deviation takes place, an additional falling off or slightly upwardly raised step is formed. The additional step is formed when the axial extension of the base body 55 is smaller or greater than the axial extension of the step 53.

The screw shown in FIG. 8 provides particularly good transporting characteristics. The smooth flat transportation surface, formed of surfaces 58 and 59, during rotation of the screw 31, provides only a minimal resistance to the transporting material. The relatively large step 41, formed by the screw threads 33 and 35, prevents falling of the transporting material back into the inner space of the screw 31, even with a relatively large inclination angle 1 (FIG. 1).

By selecting different steps, FIGS. 3–8 show only a small number of possible designs of the screw 31, the delivery output of the screw conveyor can be advantageously changed also when the screw conveyor is arranged horizontally so that the central axis 19 extends horizontally. By providing several steps, so-called transporting pockets are formed which permit to increase the amount of the solid materials delivered by the conveyor.

It is common for all embodiments that the surfaces which serves for transporting the solid materials, specifically, the transporting surfaces of the screw threads extend transverse to he screw central axis 19, with the steps formed by adjacent screw threads extending transverse to the large surfaces of the screw threads and parallel to the central axis 19. Further, the steps between the separate screw threads do not apply to the transported solid material radially outwardly acting forces, so that friction losses are minimal and jamming of the screw is reliably prevented.

From the foregoing discussion, it should be clear that the number, width and height of separate screw threads can be adapted to a particular embodiment of the screw conveyor in which the inner diameter of the free space of the shankless screw and the outer diameter of the screw have to meet particular requirements.

Though the present invention was shown and described with reference to the preferred embodiments, various modification thereof will be apparent to those skilled in the art and, therefore, it is not intended that the invention be limited to the disclosed embodiments and details thereof, and departure may be made therefrom within the spirit and scope of the present invention as defined in the appended claims.

What is claimed is:

1. A screw conveyor for transporting solid materials, comprising:
    a feed screw formed at least partially as a shankless screw, said screw defining an axis;
    a jacket surrounding the feed screw; and
    a brush cooperating with an inner surface of the jacket;
    wherein the feed screw includes a plurality of substantially band-shaped screw threads extending along an imaginary helical line and arranged, when viewed in a transporting direction, one behind another with an ever increasing distance from the screw axis so that each two adjacent screw threads form a step therebetween, and wherein the brush is arranged on the step formed by two outmost screw threads.

2. A screw conveyor as set forth in claim 1, wherein the brush has, when viewed in the transportation direction, a front surface which is aligned with a substantially radially extending, with respect to the screw axis, surface of a screw thread adjacent to an outmost screw thread.

3. A screw conveyor as set forth in claim 2, wherein the front surface of the brush is slightly inclined relative to the surface of the screw thread adjacent to the outmost screw thread.

4. A screw conveyor as set forth in claim 1, wherein the brush extends parallel to the outmost screw thread.

5. A screw conveyor as set forth in claim 1, further comprising clamping means for securing the brush to an outmost screw thread which serves as a brush support.

6. A screw conveyor as set forth in claim 1, wherein the brush has a base body, and a multiplicity of bristles projecting from the base body and extending substantially parallel to an outmost screw thread.

7. A screw conveyor as set forth in claim 6, further comprising clamping means for securing the base body to the outmost screw thread.

8. A screw conveyor as set forth in claim 7, wherein the clamping means comprises a clamping clip and a tensioning element for applying a clamping force to the clamping clip.

9. A screw conveyor as set forth in claim 8, wherein the tensioning element is countersunk in the clamping clip.

10. A screw conveyor as set forth in claim 8, wherein the clamping means, together with the tensioning element, is countersunk, when viewed in the transporting direction, in front surfaces of the screw thread adjacent to the outmost screw thread and the base body.

11. A screw conveyor as set forth in claim 6, wherein the brush base body forms with the screw thread adjacent to the outmost screw thread an inclined step, which is inclined toward the jacket with respect to the screw thread adjacent to the outmost screw thread.

12. A screw conveyor as set forth in claim 1, wherein the screw threads partially overlap each other.

13. A screw conveyor as set forth in claim 1, wherein the plurality of screw threads consists of four screw threads.

14. A screw conveyor as set forth in claim 1, wherein the screw threads have different widths, measured in a direction transverse to a direction of the screw axis.

15. A screw conveyor as set forth in claim 1, wherein the screw threads have different heights, measured in a direction of the screw axis.

16. A screw conveyor as set forth in claim 1, wherein a width of an innermost screw thread is very small in comparison with a length thereof measured in an axial direction of the screw axis.

17. A screw conveyor as set forth in claim 16, wherein the innermost screw thread is formed as a bar extending parallel to the screw axis.

18. A screw conveyor as set forth in claim 1, wherein the jacket is formed at least partially as a sieve jacket.

\* \* \* \* \*